Patented Nov. 17, 1931

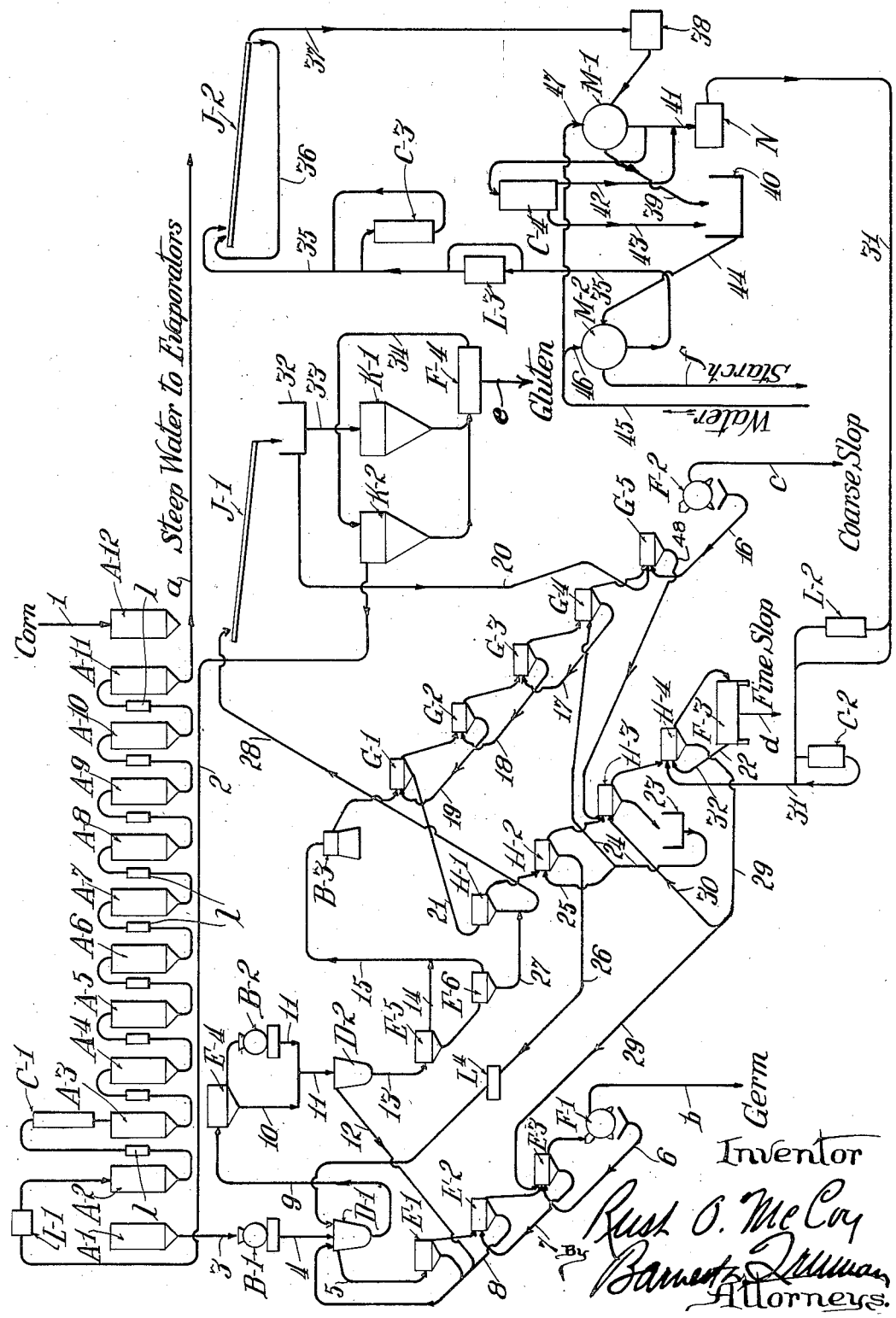

1,832,229

UNITED STATES PATENT OFFICE

RUSH O. McCOY, OF BERWYN, ILLINOIS, ASSIGNOR TO INTERNATIONAL PATENTS DEVELOPMENT COMPANY, OF WILMINGTON, DELAWARE, A CORPORATION OF DELAWARE

MANUFACTURE OF STARCH

Application filed April 11, 1927. Serial No. 182,880.

This invention relates to processes of manufacturing starch, especially from corn, in accordance with which the liquids used for separating the starch from the other ingredients of the starch bearing material are returned and re-used for subsequent separating operations; the present invention having for its object the provision of certain improvements in a process of this character whereby a better separation is obtained, as between the starch and gluten, particularly, with a consequent larger yield of starch; whereby less equipment is necessary for carrying out the process, especially in respect to the gluten settlers; whereby the operations are shortened so that the materials undergoing separation are in process for a considerably less time; and whereby the system is more flexible in its operation and the control thereof, to meet variable manufacturing conditions, is thereby facilitated.

Because of these improvements, and such other incidental improvements as will be referred to in the following description of a preferred embodiment of my invention, the invention presents a system of manufacturing starch which can be operated much more economically, efficiently and conveniently than the cyclic systems of starch manufacture heretofore used.

The accompanying drawing is a flow sheet diagram illustrating a preferred system of manufacturing starch from corn in accordance with the principles of this invention. It will be understood that the invention is not limited to the use of the particular apparatuses indicated on the drawing nor their exact arrangement as shown. Shaking screens might be used in place of reels and other substitutions of equivalent apparatuses made without departure from the invention.

The process may be considered as divided into the following steps or stages:

(1) Steeping the corn.

(2) Disintegrating the steeped corn and separating the germ from the other constituents of the grain. (3) Grinding the residue, the grits, hulls, fibre and gluten, and subjecting the ground material to a "coarse slop" separation in copper reels or shakers which removes the larger particles of bran, hull and fibre. (4) Subjecting the starch liquor from the "coarse slop" separation to a "fine slop" separation over silk for the purpose of eliminating finer particles of bran, etc.

(5) Tabling the starch liquor obtained from the above mentioned operations for the purpose of separating the gluten from the starch.

(6) Filtering and washing the starch taken from the starch tables to eliminate the soluble substances from the starch.

It has long been customary to run the water and gluten that tails off from the starch tables into so-called gluten settlers in which insoluble solids, the gluten with some starch and bran particles, gradually subside. After this operation, which may consume several hours time, is complete, the water is siphoned off from the settlers and is either discharged to the sewer or is used back in the process, in part or wholly, for steeping the corn and for the wet starch process operations.

My present invention makes a radical departure from this method of procedure. Only a part of the gluten and water from the starch tables is run into the gluten settlers, that is, only enough of the starch table effluent to supply the steeps with gluten water clarified by settling. This may be two-fifths of the starch table effluent. The balance of the gluten and water mixture is returned without settling or treatment of any sort to the wet starch process, for use in the germ, coarse slop and fine slop separations, or in one or two of these three operations.

By this novel method of procedure a considerable portion of the gluten and water mixture is given a reseparation with the result that it yields up a certain amount of the starch which it contains and which otherwise would have gone out of the system with the gluten. The separation as between starch and gluten is therefore more complete and the net yield of starch increased. Moreover, it is possible to dispense with a large number of the gluten settlers heretofore used which occupy a great deal of floor space. Because more than half of the gluten and water mixture is not settled but is returned directly to the process, the average time that the material is in process is considerably diminished and the process shortened to this extent.

The practical embodiment of the invention as illustrated in the flow sheet drawing hereto attached will now be described.

*(1) Steeping.*—The steeping system by itself forms no part of this invention, but it will be described in order that the system as a whole may be understood. Any suitable steeping apparatus may be employed. I have shown a counter current steeping system consisting of twelve steep tanks designated A—1 to A—12 inclusive, which are connected so that the steep water will pass from one to the other of the steeps in succession. At the stage of the process illustrated in the drawing the steeping of the corn in tank A—1 has been completed and the grain is being withdrawn to the mill B—1. Steep tank A—12 is being filled through pipe 1 with fresh corn. The corn in steep A—2 has been in process for the longest period and is being washed with gluten overflow water to remove solubles and reduce sulphur dioxide content. The next oldest corn is in steep A—3 and so on, the freshest corn under treatment being in steep A—11. Gluten overflow water from the gluten settlers (to be described) enters the steep A—2, containing the nearly finished corn, through pipe 2, passing first through a heater L—1, in which it is heated to the customary steeping temperature of 125° or 130° F. This liquid washes the corn in A—2 and then goes to steep A—3 first passing through a sulphur tower C—1 which supplies sulphur, combining with the water as sulphurous acid. After passing continuously through the steeps from A—2 to A—11, and their individual heaters 1, the steep water, now containing a considerable quantity of soluble matter and having a density of from 3½° to 5° Baumé, is discharged through pipe *a* from steep A—11 to the evaporators where it is concentrated to a density suitable for mixing with the offal from the wet starch operations, which offal is sold as cattle feed. The steeping operation is a progressive, step by step operation. At the next stage steep A—2 containing the fully steeped corn will be cut out and its contents sent to the mill; steep A—1 will be filled with fresh grain; and steep A—2 will be cut into the tail end of the system and steep water from this steep withdrawn and sent to the evaporators.

*Wet starch process operations*—*(2) Germ separation.*—Steeped grain from steep A—1 passes through pipe 3 to the mill B—1 which disintegrates the grain sufficiently to free the germ. The disintegrated material passes through pipe 4 into the separator D—1 which contains a starch liquor of such density that the germ will float while the other constituents of the disintegrated corn will settle to the bottom of the separator. Most of the germs in the material pass from the separator through pipe 5 to a germ reel E—1 and from this reel through reels E—2 and E—3 (which latter receives liquid from the starch washing system through pipe 29 as will be hereinafter described) and the germs then go to a press or squeezer F—1. The germs pressed to extract as much water as possible are discharged from the system at *b*. The water from the squeezer passes by pipe 6 to reel E—3; the liquid from E—3 passes by pipe 7 to reel E—2; and the liquid from reels E—2 and E—1 is returned by pipe 8 to separator D—1.

The grits and hulls subsiding to the bottom of separator D—1, pass through pipe 9 to a draining reel E—4 and then to a second mill B—2. The liquid from the draining reel and the material disintegrated in mill B—2 pass through pipes 10 and 11 to a second separator D—2 from which any germs that may be in the material are returned by pipe 12 to the separator D—1. The hull and grits go from the separator D—2 through pipe 13 to a copper draining reel E—5 and from there to a silk reel E—6. The tailings from the reels E—5, E—6 pass through pipes 14 and 15 to a buhr mull B—3, where the material is finally ground for the coarse and fine slop separations.

*(3) Coarse slop.*—The material ground in buhr mill B—3 is passed successively through coarse slop reels G—1, G—2, G—3 and G—4 and washing reel G—5 and then to the press or squeezer F—2. Water from the squeezer passes by pipe 16 to the reel G—5. Liquid from the reel G—4 passes through 17 to reel G—3; liquid from G—3 passes through 18 to reel G—2; and liquid from reel G—2 passes through 19 to reel G—1. The material in reel G—5 is washed by the liquid from the squeezer, as stated, and also by a gluten and water mixture from the tables entering the reel through pipe 20. The coarse slop offal is discharged from the system at *c*.

*(4) Fine slop.*—The liquid from the coarse slop reel G—1 passes by pipe 21 to a silk reel H—1 and then to similar reels H—2, H—3 and H—4 and to the press F—3. Water from the press F—3 goes back by pipe 22 to reel H—4. Liquid from reel H—3 goes into a tank 23 and from there is distributed by pipe 24 to the reel G—4 and by pipe 25 to the reel H—2. Liquid from the reel H—2 passes by pipe 26 to the separator D—1. In order to raise the temperature in the separators D—1, D—2 to the customary temperature of 96° F. to 100° F. a heater L—4 may be placed in pipe 26 or in pipe 8 or in both. Liquids from the reels E—6 and H—1 pass by pipes 27 and 28 to the starch tables. The fine slop offal is discharged from press F—3 at *d*. Liquid from the reel H—4 passes by pipe 29 to the washing germ reel E—3 and by pipe 30 to the fine slop reel H—3. Additional liquid is supplied to the fine slop washing reel H—4 from the starch filters, to be described, through pipe 31, a part of this flow preferably passing through a heater L—2 and sulphur tower C—2.

(5) *Tabling.*—The starch liquor from the wet starch process operations, at a density, for example, of from 6° to 8° Baumé, passes to the starch tables through pipe 28 as described. In the drawing two tables are shown, one designated J—1 on which the starch is being deposited and the other designated J—2 from which the starch is being flushed. In actual practice these operations will be carried out simultaneously, as indicated in the drawing, the starch being deposited on certain tables while it is being removed from others. The starch liquor from the wet starch process operations contains a considerable quantity of gluten and when the liquor is flowed over table J—1, the starch deposits on the table while the water and gluten tails off into the tank 32. From this tank a part of the water and gluten mixture is returned, as described, through pipe 20 to the wet starch process. The rest of the gluten and water mixture goes through pipe 33 to gluten settler K—1. A second gluten settler is indicated at K—2, which has already been filled from tank 32. After the gluten has settled in K—2 the water is syphoned off and passes, as described, through pipe 2 to the steeping system. The gluten is filter-pressed in press F—4 going out of the system at e, the water from the press being returned by pipe 34 to the settler K—2.

(6) *Starch washing.*—The starch on the table J—2 is preferably removed by flushing, or if shoveled or stripped from the table, is diluted, by water derived from the filtering of the starch to be hereafter described. This water passes to the starch table J—2 through pipe 35, a part preferably passing through a heater L—3 and through a sulphur tower C—3. The liquid is repeatedly circulated over the table by pipe 36 and when the proper gravity is reached is discharged by pipe 37 into a tank 38. From here it is sent to the first of a pair of filters M—1, M—2 which operate to dewater the starch and then to spray the same with fresh water. Preferably American filters are used, although other similar types could be employed. The dewatering of the starch leaves it in a thin layer through which fresh water is drawn by a vacuum produced in the filter. The starch stripped from filter M—1 passes by pipe 39 into a diluting tank 40. The filtrate from filter M—1, including the wash water, passes by pipe 41 to a filter press, preferably of the Sweetland type and designated N, a part of the flow being preferably bypassed through a sulphur tower C—4 and back to the Sweetland by pipe 42. A pipe 43 from the sulphur tower conducts sulphurized liquid to the diluting tank 40. The filtrate from the filter press N passes, as described, through pipe 31 to the wet starch process; the major portion going, as stated, to the germ system after first being passed through the reels H—4, preferably, of the fine slop system for the purpose of removal of any starch particles that the water may contain.

The starch diluted in tank 40 is dewatered and then washed in the second filter M—2, the connection between tank and filter being shown at 44. The finished starch, from which the solubles have been eliminated by the filtering operation, is discharged from the system at *f*. The filtrate and wash water from the second filter M—2, which contains a relatively small quantity of solubles, is used for flushing the starch from the tables, the connection being indicated at 35 as above set forth. Fresh water enters the system at 45 and is used exclusively for spraying the starch washed in filters M—1, M—2, the connections being indicated at 46, 47.

It will be understood that a certain amount of liquid is discharged from the system at the outlets *a*, *b*, *c*, *d*, *e* and *f*, all of the solids carrying some liquid with them. The system is so balanced that the water admitted at 45 equals the amount withdrawn at the outlets just mentioned and at the same time is sufficient to wash out the solubles with approximate completeness.

It will be understood that the various apparatuses shown as single units on the flow sheet drawing will ordinarily be used in batteries. In the description I have used the word "pipes" to describe the connections by which the fluid substances are moved from one element of the apparatus to the other, but troughs, spouts, or other conveying means might be employed. These pipes or their equivalents are furnished with control valves or gates. Sulphur dioxide is supplied to the materials in process by the sulphur tower C—1 to C—4, preferably located as indicated, or located at other points in the system wherever the application of sulphur dioxide to the materials is deemed advisable. Enough of the liquid is passed through the sulphur towers to maintain the sulphur dioxide content of the system at usual or any desired percentages. The heaters L—1, L—2, L—3, L—4 may also be varied as to their position in the system. The purpose of the heaters is to keep the materials in process at temperatures above ordinary room temperatures, as has been customary, in order to decrease the viscosity of the liquids and facilitate the separation from each other of the several constituents of the corn. The sulphur dioxide, it will be understood, serves the usual purposes for which this substance has been used in the manufacture of starch from corn. It apparently has a dissolving effect upon certain constituents of the grain and tends to inhibit fermentation.

One of the advantages of the system as above described is its flexibility. Under manufacturing conditions the different steps of the process are not always carried on at the same rate. For example, the removal of starch from the tables may proceed more rapidly or less rapidly than the grind and this necessitates a distribution of the liquid to maintain a proper water balance. A certain minimum amount of fresh water, approximately 10 gallons per bushel of corn, is required in the particular washing system described for eliminating the solubles from the starch. The flow of fresh water per unit of time will therefore depend upon the rate at which the starch is washed in the filters. Any change, therefore, in the rate of fresh water inflow makes it desirable to vary the distribution of the liquids in the other parts of the system. Adjustment of the flow of liquids as between the coarse and fine slop separations may be made by varying the flow through pipes 24 and 25. Distribution as between the germ separation and the slop separations is made by adjustment of the valves in pipes 26, 29 and 30. This feature of my invention may be employed to advantage regardless of whether or not the gluten is removed from the starch table effluent before being used in the starch separating apparatuses. The amount of gluten and water mixture returned to the wet starch process in proportion to the gluten overflow water returned to the steeps may be readily adjusted by control valves in pipes 2, 20 and 33. It will be observed that the gluten and water mixture, which of course contains quite a large percentage of solid matter, mostly gluten but also some starch and bran particles, is reintroduced into the system at a place where the coarse slop mixture is very dilute, that is, where the coarse slop already deprived of most of the starch which it originally contained is given its final sieving or washing operation before going to the squeezer. Large volumes of liquid are used for this operation and hence a good opportunity is provided for eliminating from the table effluent introduced at this point the starch particles from the larger gluten particles, which latter go out with the coarse slop offal, and for freeing the starch from the remaining gluten so that in the subsequent tabling operation these starch particles will be more likely to settle on the tables instead of being carried off again with the gluten. The dilute liquid passing through the last coarse slop reel G—5, now freed of the bulk of the solids, is sent through pipe 48 to the next to the last of the fine slop reels, reel H—3 where the fine slop is very dilute, and another opportunity is given in this reel and the succeeding reel H—4 for thorough separation of any starch that may be contained in the return gluten and water mixture. The liquids from these two reels are distributed as stated through the coarse slop, fine slop and germ systems so that the returned gluten and water mixture is thoroughly commingled with the liquids in process.

Most of the effluent of the starch washing operation goes to and constitutes the principal part of the liquid used in the germ system. This liquid body is supplemented so far as necessary by effluent from the starch tables, but this effluent does not reach the germ system until it has passed through the coarse and fine slop systems so that it has been deprived largely of its solid matter. That is the gluten, returned with the starch table effluent, is kept from entering the germ system where it might interfere with the separating operations. The gluten and water mixture is preferably run from the last of the coarse slop reels G—5 through one of the fine slop reels H—3 before it is used on the other coarse slop reels G—4, G—3, G—2, G—1, so as to eliminate the bulk of the solids and prevent too high concentration of solids in the coarse slop system.

As modifications in the arrangement shown and described will readily occur to those skilled in the art, I wish to be understood as claiming all modifications within the scope of the appended claims.

I claim:

1. In the manufacture of starch from corn by a method involving comminuting the corn, separating the starch and gluten from the germ and bran in operations using water, and separating the water and gluten from the starch: the improvement which consists in re-using water and gluten from said last named separating operation in the treatment of additional comminuted corn for separation therefrom of starch and gluten.

2. In the manufacture of starch from corn by a method involving comminuting the corn, separating the starch and gluten from the other ingredients of the corn in germ, coarse slop and fine slop operations in which water is used, tabling the starch, gluten and water to remove the gluten and water from the starch and filtering the starch with water; the improvement which consists in using, for the treatment of additional comminuted material, water from the starch filtering operation for the germ separation and water and gluten from the tabling operation for the coarse and fine slop separations.

3. In the manufacture of starch from corn by a method involving separating the starch and gluten from the germ and bran in operations using water, and tabling the resultant starch, gluten, and water magma to separate the gluten and most of the water from the starch: the improvement which consists in re-using water and gluten from the tabling operation for the treatment of additional comminuted corn for separation therefrom of starch and gluten.

RUSH O. McCOY.